(12) United States Patent
Shibayama et al.

(10) Patent No.: US 8,715,443 B2
(45) Date of Patent: May 6, 2014

(54) METHOD FOR PRODUCING SPECTROSCOPIC SENSOR

(75) Inventors: Katsumi Shibayama, Hamamatsu (JP); Masaomi Takasaka, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 13/817,876

(22) PCT Filed: Sep. 21, 2011

(86) PCT No.: PCT/JP2011/071535
§ 371 (c)(1),
(2), (4) Date: Feb. 20, 2013

(87) PCT Pub. No.: WO2012/070301
PCT Pub. Date: May 31, 2012

(65) Prior Publication Data
US 2013/0153139 A1      Jun. 20, 2013

(30) Foreign Application Priority Data
Nov. 22, 2010   (JP) ................. 2010-260440

(51) Int. Cl.
*G01J 3/28* (2006.01)
(52) U.S. Cl.
CPC ......................................... *G01J 3/28* (2013.01)
USPC ........... 156/247; 156/249; 156/285; 156/286; 156/289; 156/703; 156/719
(58) Field of Classification Search
CPC ......................................................... G01J 3/28

USPC .......... 156/247, 249, 285, 286, 289, 703, 719
See application file for complete search history.

(56) References Cited

U.S. PATENT DOCUMENTS

2011/0043823 A1*   2/2011   Hillmer et al. ................ 356/519

FOREIGN PATENT DOCUMENTS

| JP | 64-57134 | | 3/1989 | |
| JP | 2000-81512 | | 3/2000 | |
| JP | 2000081512 | A * | 3/2000 | ............... G02B 5/28 |
| JP | 2001-210810 | | 8/2001 | |
| JP | 2001210810 | A * | 8/2001 | ............. H01L 27/12 |
| JP | 2003-270042 | | 9/2003 | |
| JP | 2008017490 | A * | 1/2008 | |
| WO | 2006/100903 | | 9/2006 | |
| WO | 2008/017490 | | 2/2008 | |

* cited by examiner

*Primary Examiner* — Daniel McNally
*Assistant Examiner* — Margaret Squalls
(74) *Attorney, Agent, or Firm* — Drinker Biddle & Reath LLP (57) ABSTRACT

A method of manufacturing a spectroscopic sensor 1 comprises a first step of forming a cavity layer 21 by nanoimprinting on a handle substrate; a second step of forming a first mirror layer 22 on the cavity layer 21 after the first step; a third step of joining a light-transmitting substrate 3 onto the first mirror layer 22 after the second step; a fourth step of removing the handle substrate from the cavity layer 21 after the third step; a fifth step of forming a second mirror layer 23 on the cavity layer 21 without the handle substrate after the fourth step; and a sixth step of joining the light detection substrate 4 onto the second mirror layer 23 after the fifth step.

8 Claims, 13 Drawing Sheets

METHOD FOR PRODUCING SPECTROSCOPIC SENSOR

TECHNICAL FIELD

The present invention relates to a method of manufacturing a spectroscopic sensor.

BACKGROUND ART

Known as a conventional spectroscopic sensor is one comprising a plurality of interference filter units for transmitting therethrough light having a predetermined wavelength according to an incident position of the light, a light-transmitting substrate for transmitting therethrough the light incident on the interference filter units, and a light detection substrate for detecting the light transmitted through the interference filter units. There is a case where each interference filter unit is constructed as that of Fabry-Perot type by making a pair of mirror layers oppose each other through a cavity layer.

As a method of manufacturing such a spectroscopic sensor, the following method is described in Patent Literature 1. A plurality of one mirror layers are initially formed on the light detection substrate, and then the cavity layer is formed on the mirror layers by nanoimprinting. A plurality of the other mirror layers are subsequently formed on the cavity layer, and the light-transmitting substrate is finally joined onto the mirror layers.

CITATION LIST

Patent Literature

Patent Literature 1: International Publication No. 2008/017490

SUMMARY OF INVENTION

Technical Problem

In the method of manufacturing a spectroscopic sensor described in Patent Literature 1, however, the manufactured spectroscopic sensor may lower its reliability. The reason is as follows. Since irregularities caused by forming a light-receiving section, a wiring layer, and the like exist on a surface of the light detection substrate, a cavity layer having a high accuracy (e.g., on the order of nm in thickness) is less likely to be obtained by nanoimprinting on the mirror layers formed on such a surface. Also, since the mirror layers and cavity layer are formed on the light detection substrate in a stacking manner, each process is highly likely to damage the light detection substrate.

It is therefore an object of the present invention to provide a method of manufacturing a spectroscopic sensor which can yield a highly reliable spectroscopic sensor.

Solution to Problem

The method of manufacturing a spectroscopic sensor in accordance with one aspect of the present invention is a method of manufacturing a spectroscopic sensor comprising an interference filter unit, having a cavity layer and first and second mirror layers opposing each other through the cavity layer, for selectively transmitting therethrough light in a predetermined wavelength range according to an incident position thereof; a light-transmitting substrate for transmitting therethrough the light incident on the interference filter unit; and a light detection substrate for detecting the light transmitted through the interference filter unit; the method comprising a first step of forming the cavity layer by nanoimprinting on a handle substrate; a second step of forming the first mirror layer on the cavity layer after the first step; a third step of joining the light-transmitting substrate onto the first mirror layer after the second step; a fourth step of removing the handle substrate from the cavity layer after the third step; a fifth step of forming the second mirror layer on the cavity layer without the handle substrate after the fourth step; and a sixth step of joining the light detection substrate onto the second mirror layer after the fifth step.

This spectroscopic sensor manufacturing method forms a cavity layer on a handle substrate by nanoimprinting. Thus subjecting the handle substrate to nanoimprinting can stably yield the cavity layer with a high accuracy. After forming the cavity layer and first and second mirror layers on the light-transmitting substrate side, the light detection substrate is joined thereto. This can prevent the light detection substrate from being damaged in each process for forming the cavity layer and mirror layers. Hence, this spectroscopic sensor manufacturing method can yield a highly reliable spectroscopic sensor.

Here, the handle substrate may have a selectively removable surface layer, in the first step the cavity layer may be formed on the surface layer, and in the fourth step the handle substrate may be removed from the cavity layer by selectively removing the surface layer. Thus selectively removing the surface layer of the handle substrate can reduce the time required for removing the handle substrate from the cavity layer, while preventing the cavity layer from being damaged.

In the first step, when joining the light-transmitting substrate onto the first mirror layer with an optical resin layer interposed therebetween in the third step, the cavity layer may be formed on the handle substrate such that the cavity layer includes a region where the optical resin layer is arranged. This allows only the cavity layer to come into contact with the handle substrate when removing the latter, whereby the handle substrate can be removed under a simple condition.

An optical filter layer for transmitting the light in the predetermined wavelength range therethrough may be formed on the light-transmitting substrate before the third step, and in the third step the light-transmitting substrate may be joined onto the first mirror layer such that the first mirror layer and the optical filter layer oppose each other. This can make the light in the predetermined wavelength range efficiently incident on the interference filter unit.

Advantageous Effects of Invention

The present invention can yield a highly reliable spectroscopic sensor.

DESCRIPTION OF EMBODIMENTS

In the following, preferred embodiments of the present invention will be explained in detail with reference to the drawings. In the drawings, the same or equivalent parts will be referred to with the same signs while omitting their overlapping descriptions.

Figure 1:
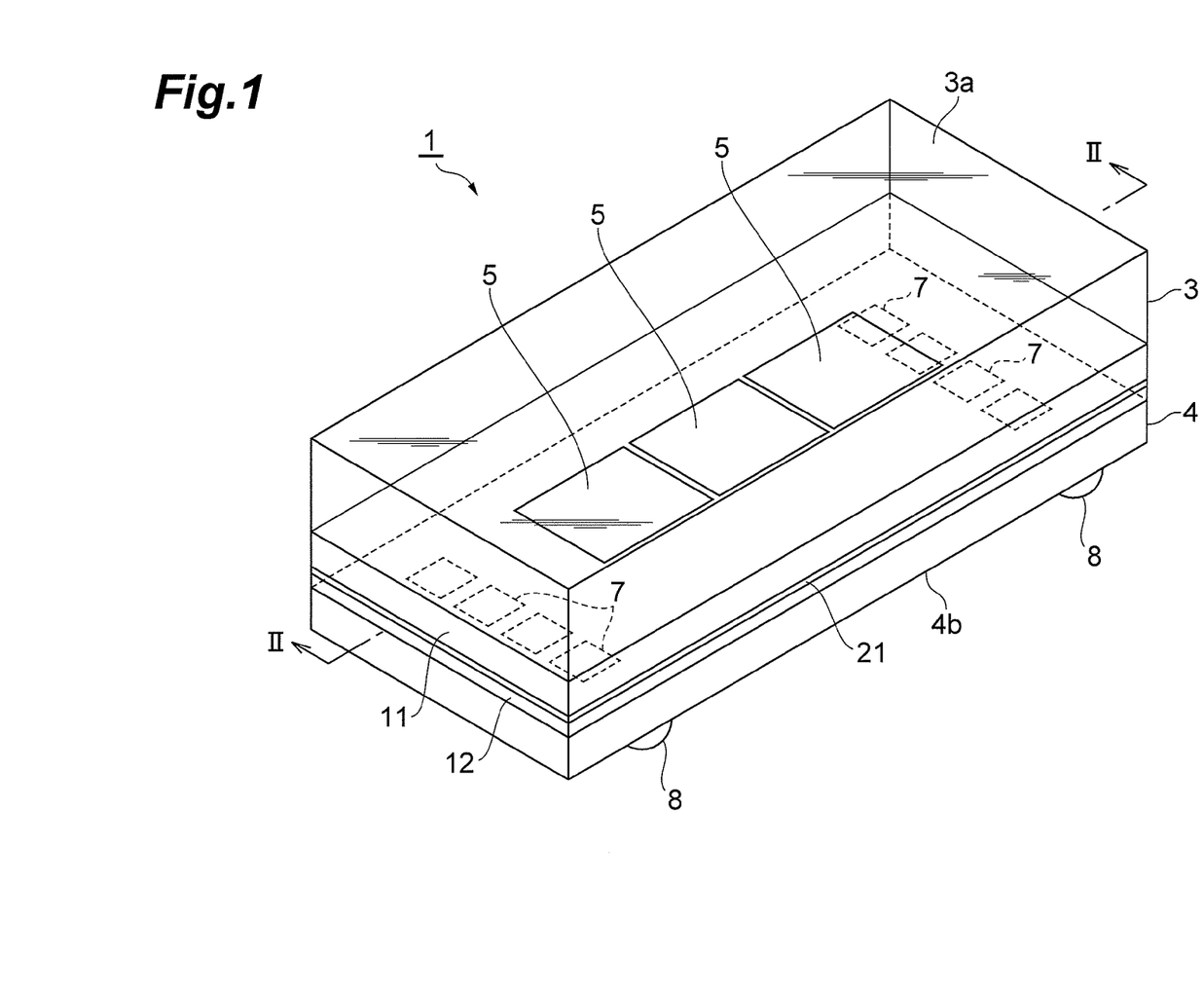
FIG. 1 is a perspective view of a spectroscopic sensor manufactured by the spectroscopic sensor manufacturing method in accordance with an embodiment of the present invention.
Figure 2:
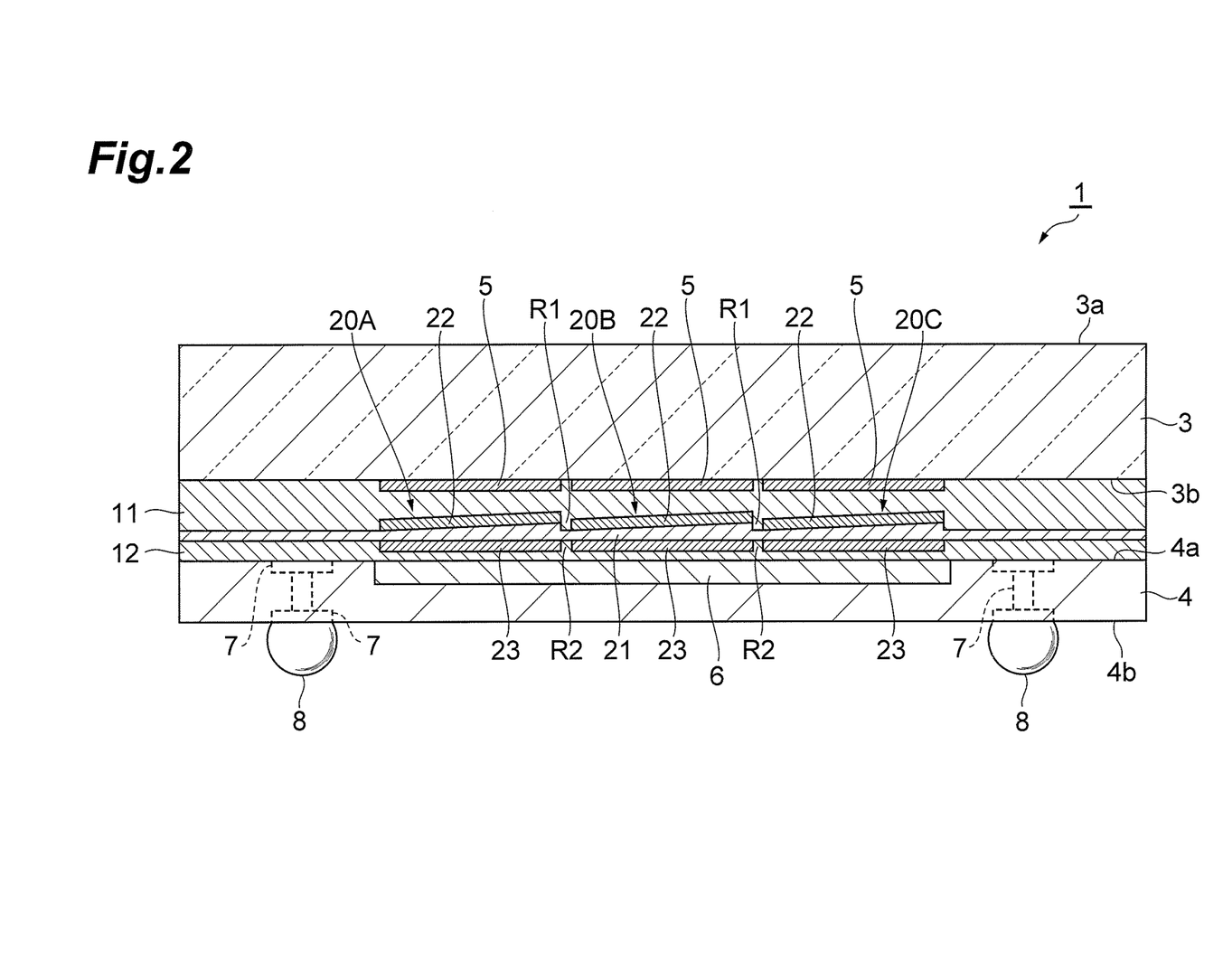
FIG. 2 is a sectional view taken along the line II-II of FIG. 1.

As illustrated in FIGS. 1 and 2, a spectroscopic sensor 1 comprises a plurality of interference filter units 20A, 20B, 20C for selectively transmitting therethrough light in a predetermined wavelength range according to an incident position thereof, a light-transmitting substrate 3 for transmitting therethrough the light incident on the interference filter units 20A to 20C, and a light detection substrate 4 for detecting the light transmitted through the interference filter units 20A to 20C. The spectroscopic sensor 1 is constructed as a rectangular parallelepiped CSP (Chip Size Package), while the interference filter units 20A to 20C are arranged in a row longitudinally of the spectroscopic sensor 1 between the light-transmitting substrate 3 and the light detection substrate 4.

The light-transmitting substrate 3, which is made of glass or the like, is formed into a rectangular sheet having a thickness of about 0.2 to 2 mm. Optical filter layers 5 are formed on a rear face 3b of the light-transmitting substrate 3 so as to oppose the respective interference filter units 20A, 20B, 20C. Each optical filter layer 5, which is a dielectric multilayer film or organic color filter (color resist), is formed into a rectangular film having a thickness of about 0.1 to 10 μm. The optical filter layers 5 function as bandpass filters for transmitting therethrough light in a predetermined wavelength range to be made incident on their opposing interference filter units 20A to 20C.

The light detection substrate 4, which is a photodiode array, is formed into a rectangular sheet having a thickness of about 10 to 150 μm. A light-receiving unit 6 for receiving the light transmitted through the interference filter units 20A to 20C is formed on a front face 4a of the light detection substrate 4. The light-receiving unit 6 is constructed by one-dimensionally arranging elongated photodiodes, each extending along a direction substantially perpendicular to the longitudinal direction of the light detection substrate 4, longitudinally of the light detection substrate 4. The light detection substrate 4 is also formed with leads 7 (front face leads, rear face leads, through-hole leads, etc.) for taking out electric signals photoelectrically converted by the light-receiving unit 6. The rear face 4b of the light detection substrate 4 is provided with surface-mounting bumps 8 electrically connected to their corresponding leads 7. The light detection substrate 4 is not limited to the photodiode array, but may be any of other semiconductor light detection elements (C-MOS image sensors, CCD image sensors, etc.).

Each of the interference filter units 20A, 20B, 20C has a cavity layer 21 and DBR (Distributed Bragg Reflector) layers 22, 23. In each of the interference filter units 20A to 20C, the DBR layer (first mirror layer) 22 and DBR layer (second mirror layer) 23 oppose each other through the cavity layer 21. That is, the cavity layer 21 keeps a distance between the DBR layers 22, 23 opposing each other (while the thickness of the cavity layer 21 varies among the interference filter units 20A, 20B, 20C). Each of the DBR layers 22, 23 is a dielectric multilayer film formed into a rectangular film having a thickness of about 0.1 to 10 μm. The interference filter units 20A, 20B, 20C have the respective DBR layers 22 with thicknesses different from each other and similarly the respective DBR layers 23 with thicknesses different from each other.

The DBR layers 22, which are located closer to the light-transmitting substrate 3 than is the cavity layer 21, are separated from each other for their corresponding interference filter units 20A to 20C. The DBR layers 23, which are located closer to the light detection substrate 4 than is the cavity layer 21, are separated from each other for their corresponding interference filter units 20A to 20C. A region R1 between the adjacent DBR layers 22, 22 and a region R2 between the adjacent DBR layers 23, 23 each have a width of about 0.5 to 10 μm.

The cavity layer 21, which is made of a light-transmitting material (an optical resin, glass, a semiconductor, a dielectric, or the like), is integrally formed over each of the interference filter units 20A to 20C. The cavity layer 21 has outer edge parts reaching their corresponding side faces of the spectroscopic sensor 1 (i.e., side faces of the light-transmitting substrate 3 and light detection substrate 4), so that their side faces are flush with each other. In each of the interference filter units 20A to 20C, the thickness of the cavity layer 21 gradually increases within the range of about 100 to several hundreds of nm to one side longitudinally of the spectroscopic sensor 1. As a consequence, the wavelength of light incident on each channel of the light-receiving unit 6 of the light detection substrate 4 is uniquely determined by the kind and thickness of the DBR layers 22, 23 and thickness of the cavity layer 21 in the part opposing the channel.

The light-transmitting substrate 3, which is arranged closer to the DBR layers 22 than is the cavity layer 21, is joined to the DBR layers 22 with an optical resin layer 11 interposed therebetween. As a consequence, the optical filter layers 5 oppose their corresponding DBR layers 22 of the interference filter units 20A to 20C through the optical resin layer 11. The light detection substrate 4, which is arranged closer to the DBR layers 23 than is the cavity layer 21, is joined to the DBR layers 23 with an optical resin layer 12 interposed therebetween. Each of the optical resin layers 11, 12 is made of an optical resin such as an organic material based on epoxy, acrylic, or silicone or an organic-inorganic hybrid material and formed with a thickness of about 5 to 100 μm.

When the light entering the light-transmitting substrate 3 from its front face 3a passes therethrough and reaches its rear face 3b in thus constructed spectroscopic sensor 1, only light in a predetermined wavelength to be incident on the interference filter units 20A to 20C is transmitted through the optical filter layers 5. When the light transmitted through the optical filter layers 5 reaches the interference filter units 20A to 20C, light in a predetermined wavelength range is selectively transmitted therethrough according to its incident position. That is, the wavelength of light incident on each channel of the light-receiving unit 6 of the light detection substrate 4 is uniquely determined by the kind and thickness of the DBR layers 22, 23 and thickness of the cavity layer 21 at the incident position. As a consequence, different wavelengths of light are detected for the respective channels of the light-receiving unit 6 in the light detection substrate 4.

Figure 3:
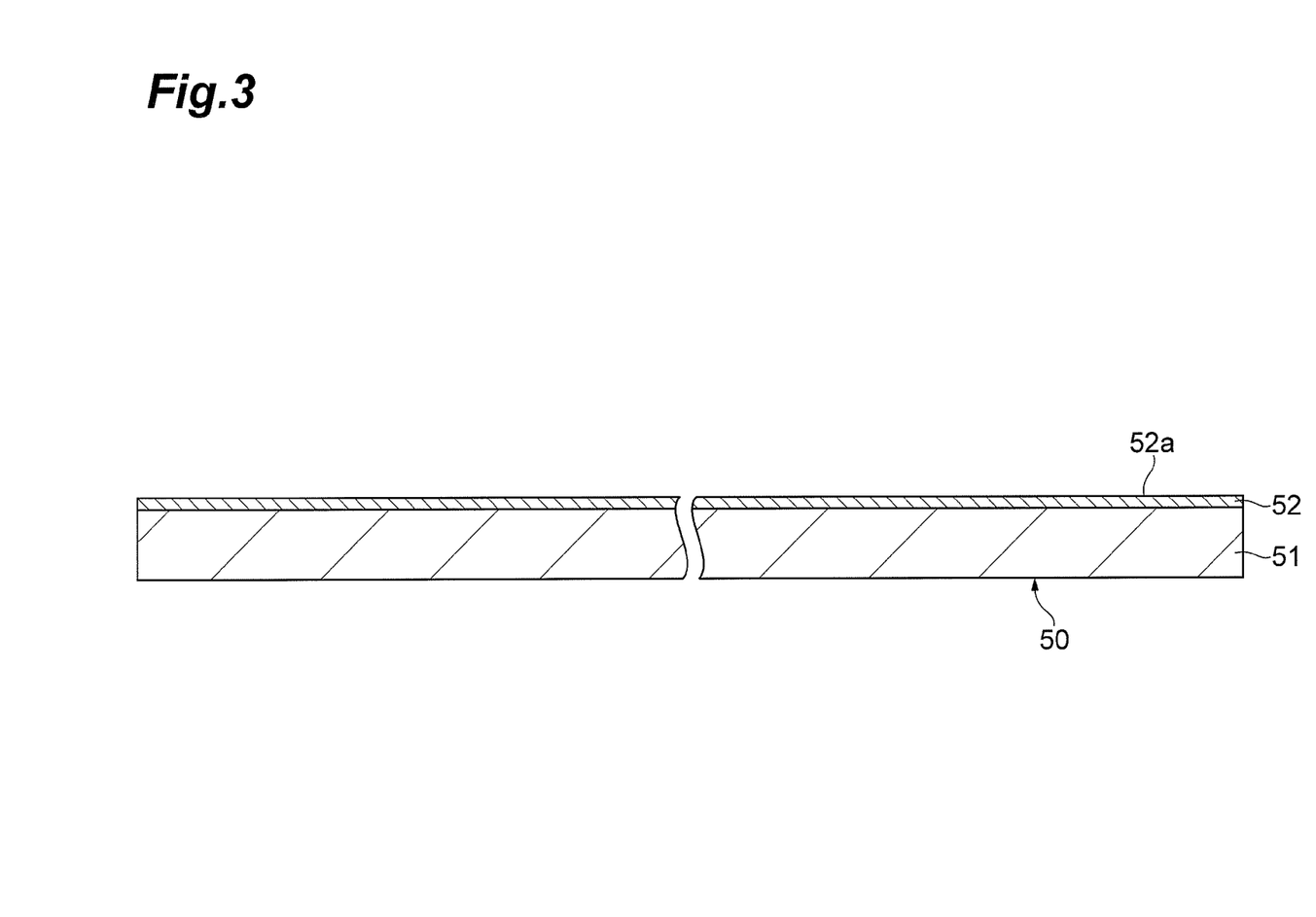
FIG. 3 is a sectional view for explaining the method of manufacturing the spectroscopic sensor of FIG. 1.

A method of manufacturing the above-mentioned spectroscopic sensor 1 will now be explained. First, as illustrated in FIG. 3, a handle substrate 50 is prepared. The handle substrate 50 has a base layer 51 and a surface layer 52. The surface layer 52 is a sacrificial layer which can selectively be etched away and has a front face 52*a* which is a flat and smooth surface (a smooth surface with a surface roughness Ra of several nm or less). The base layer 51 is made of silicon, silica, glass, or the like. The surface layer 52 is made of $SiO_2$, silicon, a metal, a resin, or the like and formed with a thickness on the order of several tens of nm to several tens of μm.

Figure 4:
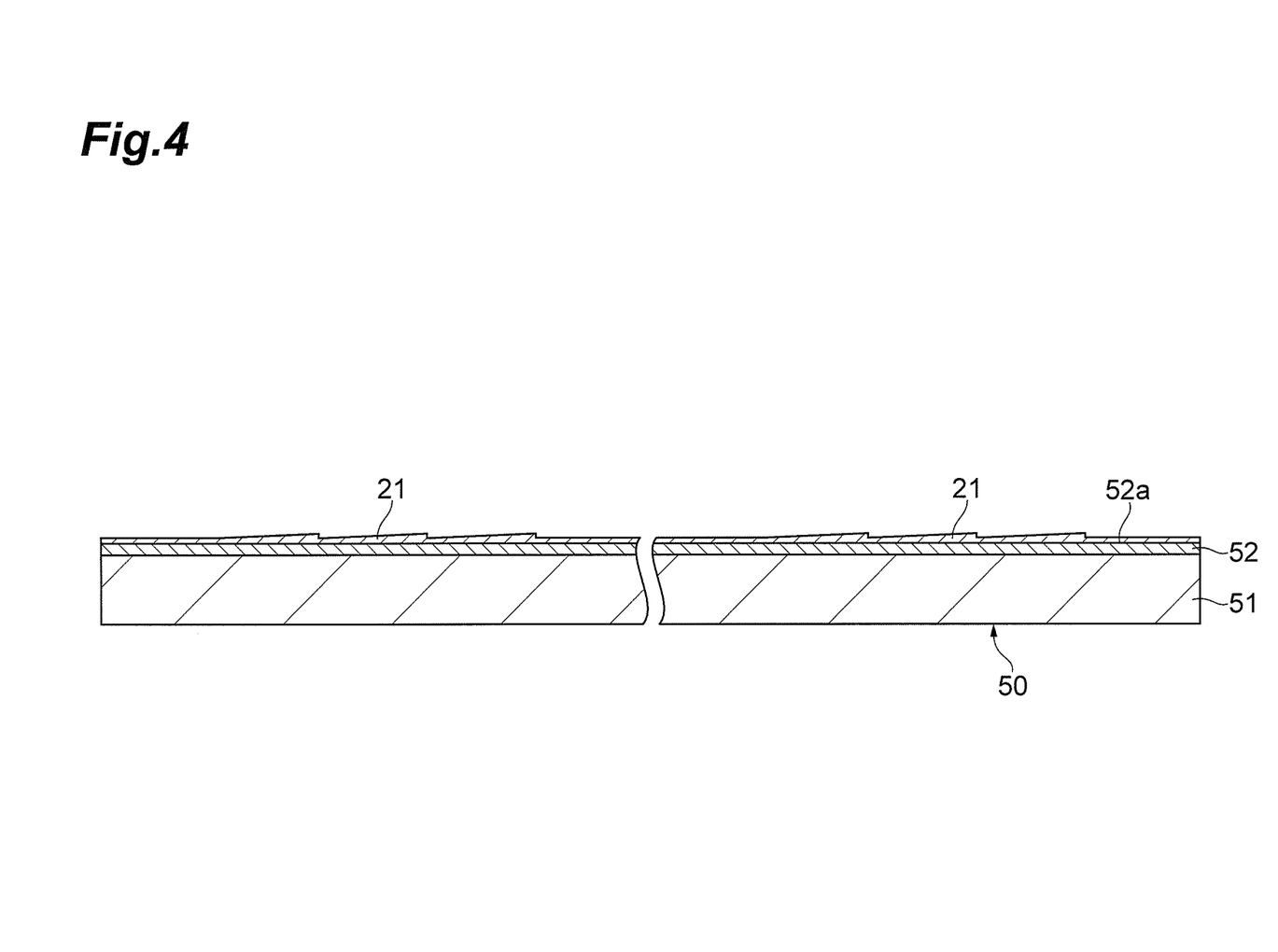
FIG. 4 is a sectional view for explaining the method of manufacturing the spectroscopic sensor of FIG. 1.

Subsequently, as illustrated in FIG. 4, a plurality of cavity layers 21 arranged in a matrix are integrally formed by nanoimprinting on the front face 52*a* of the surface layer 52 (i.e., on the surface layer 52) of the handle substrate 50. Here, the outer edge parts of the cavity layers 21 are made to reach and become flush with their corresponding side faces of the handle substrate 50 (i.e., the side faces of the base layer 51 and surface layer 52). For performing the nanoimprinting, a material for the cavity layers 21 is substantially uniformly applied to the whole front face 52*a* and shaped into a desirable cavity form by a mold under heat, pressure, UV irradiation, or the like. The molding by nanoimprinting may be performed in the unit of a chip (a part corresponding to one spectroscopic sensor 1) or in the unit of a block containing a plurality of chips by a step-and-repeat scheme or at once on the whole surface.

Figure 5:
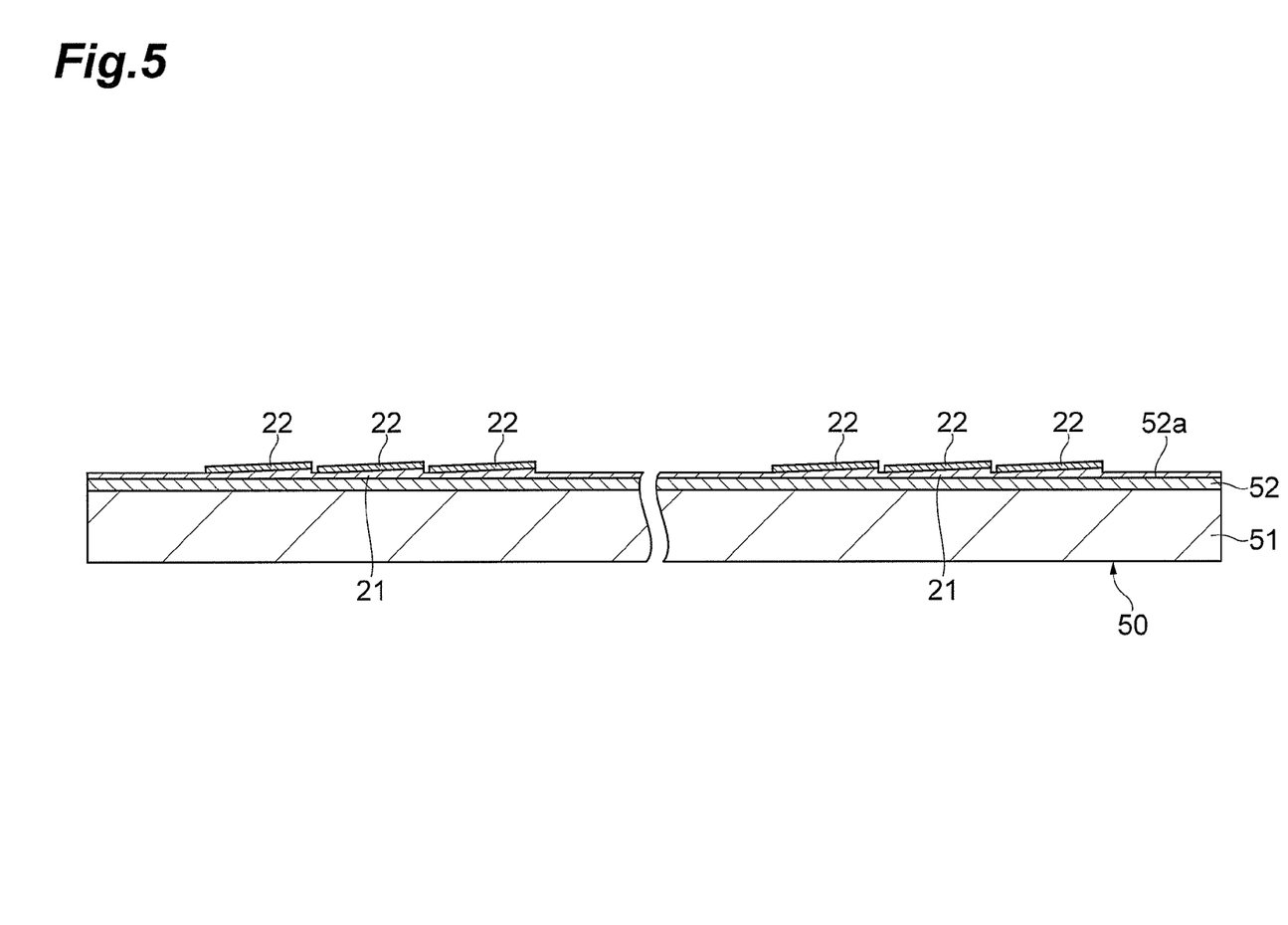
FIG. 5 is a sectional view for explaining the method of manufacturing the spectroscopic sensor of FIG. 1.

Thereafter, as illustrated in FIG. 5, the DBR layers 22 are formed on the cavity layer 21 for each part corresponding to one spectroscopic sensor 1. For forming the DBR layers 22, film-forming by ion plating, vapor deposition, sputtering, or the like and patterning by photo-etching and liftoff or etching are performed. Each of the DBR layers 22 is a dielectric multilayer film which is a laminated film made of $SiO_2$, $TiO_2$, $Ta_2O_5$, $Nb_2O_5$, $Al_2O_3$, $MgF_2$, or the like.

Figure 6:
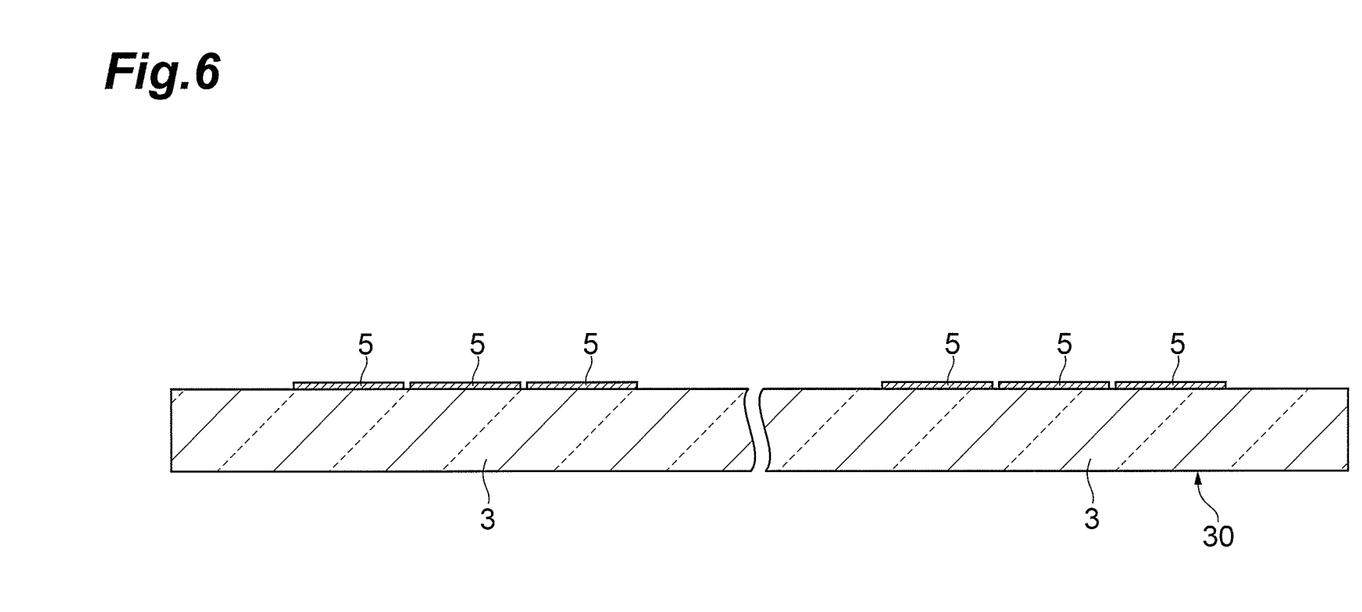
FIG. 6 is a sectional view for explaining the method of manufacturing the spectroscopic sensor of FIG. 1.

On the other hand, as illustrated in FIG. 6, a light-transmitting wafer 30 including a plurality of light-transmitting substrates 3 arranged in a matrix is prepared, and the optical filter layer 5 is formed for each part corresponding to the light-transmitting substrate 3 on the light-transmitting wafer 30 (i.e., on the light-transmitting substrate 3). When forming the optical filter layer 5 from a dielectric multilayer film, film-forming by ion plating, vapor deposition, sputtering, or the like and patterning by photo-etching and liftoff or etching are performed. When forming the optical filter layer 5 from an organic color filter, it is patterned by exposure/development or the like as with a photoresist.

Figure 7:
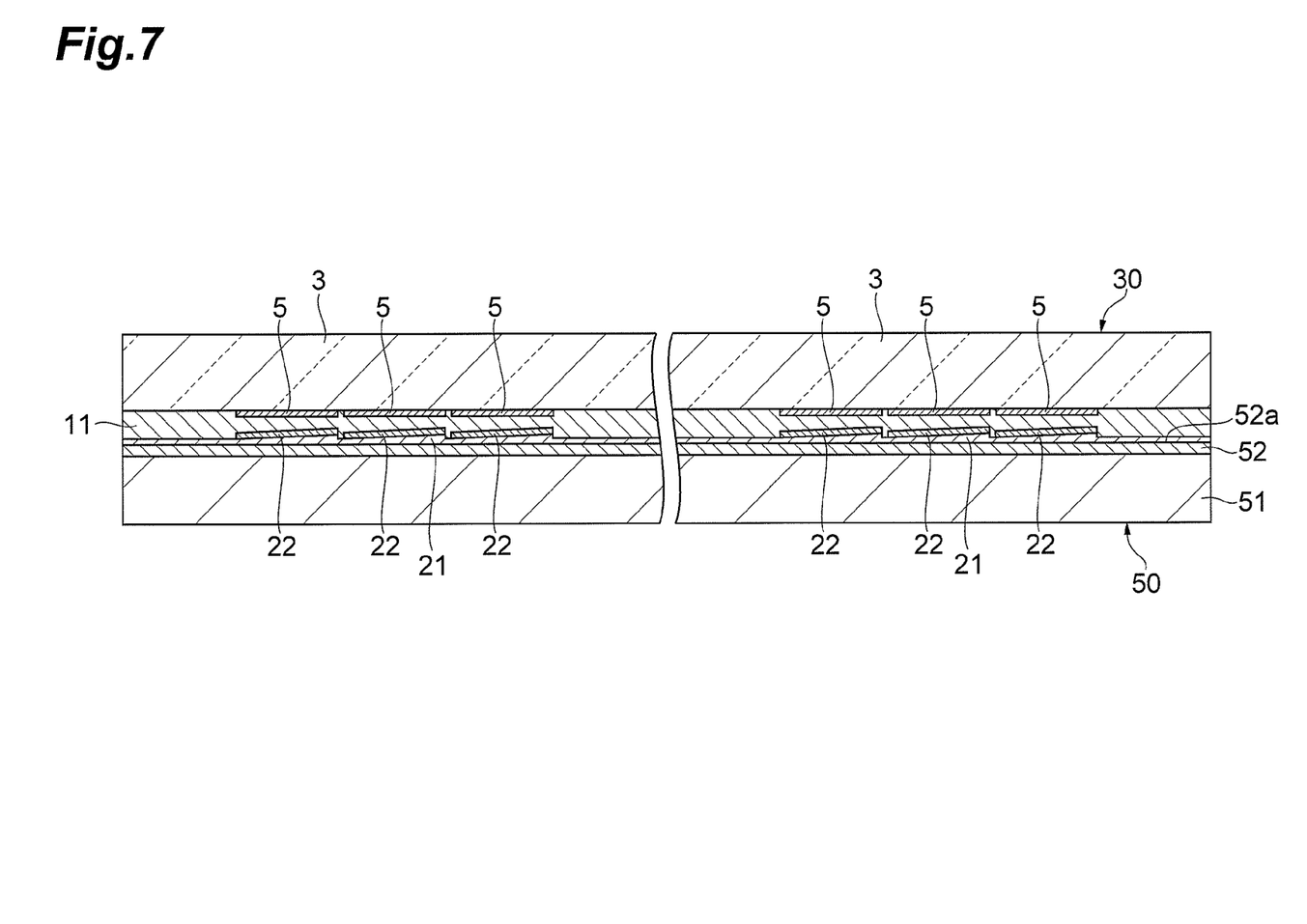
FIG. 7 is a sectional view for explaining the method of manufacturing the spectroscopic sensor of FIG. 1.

Next, as illustrated in FIG. 7, the handle substrate 50 and the light-transmitting wafer 30 are joined to each other with the optical resin layer 11 such that the DBR layers 22 oppose their corresponding optical filter layers 5 for each part corresponding to one spectroscopic sensor 1. That is, the light-transmitting substrate 3 is joined onto the DBR layers 22 with the optical resin layer 11 interposed therebetween such that the DBR layers 22 oppose the optical filter layers 5. For this joint, after the optical resin layer 11 is applied to the whole surface of at least one of the handle substrate 50 and light-transmitting wafer 30, the handle substrate 50 and the light-transmitting wafer 30 are aligned with each other and joined together under heat, pressure, UV irradiation, or the like. Here, joining them in vacuum and then returning them into the air can inhibit voids from occurring in the optical resin layer 11.

Figure 8:
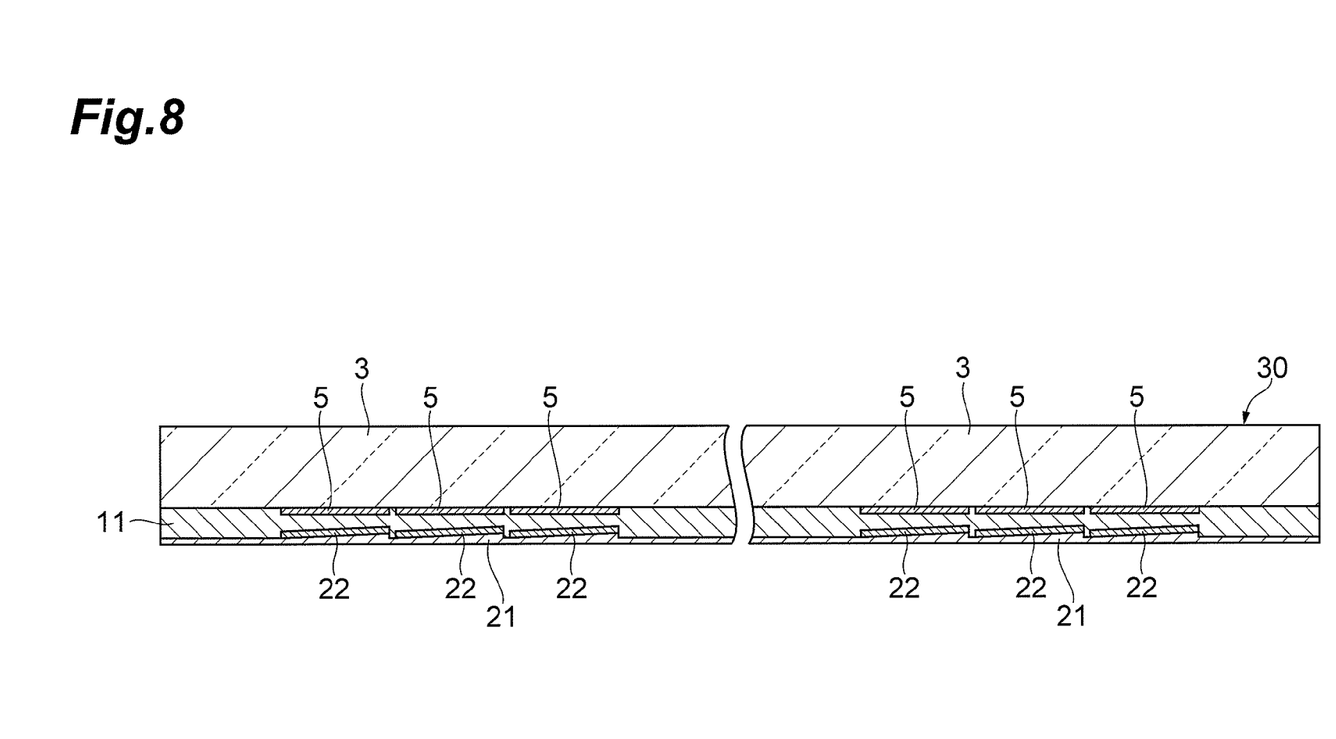
FIG. 8 is a sectional view for explaining the method of manufacturing the spectroscopic sensor of FIG. 1.

Subsequently, as illustrated in FIG. 8, the surface layer 52 is selectively etched away by wet etching or dry etching, so as to remove the handle substrate 50 from the cavity layer 21. Since the outer edge parts of the cavity layer 21 have reached the side faces of the handle substrate 50 (i.e., the side faces of the base layer 51 and surface layer 52), while only the cavity layer 21 is in contact with the surface layer 52, the surface layer 52 can be removed by a single etchant which effectively acts on the interface between the surface layer 52 and the cavity layer 21. For efficiently removing the surface layer 52, the base layer 51 of the handle substrate 50 may be formed with a through hole for letting the etchant advance therethrough.

Figure 9:
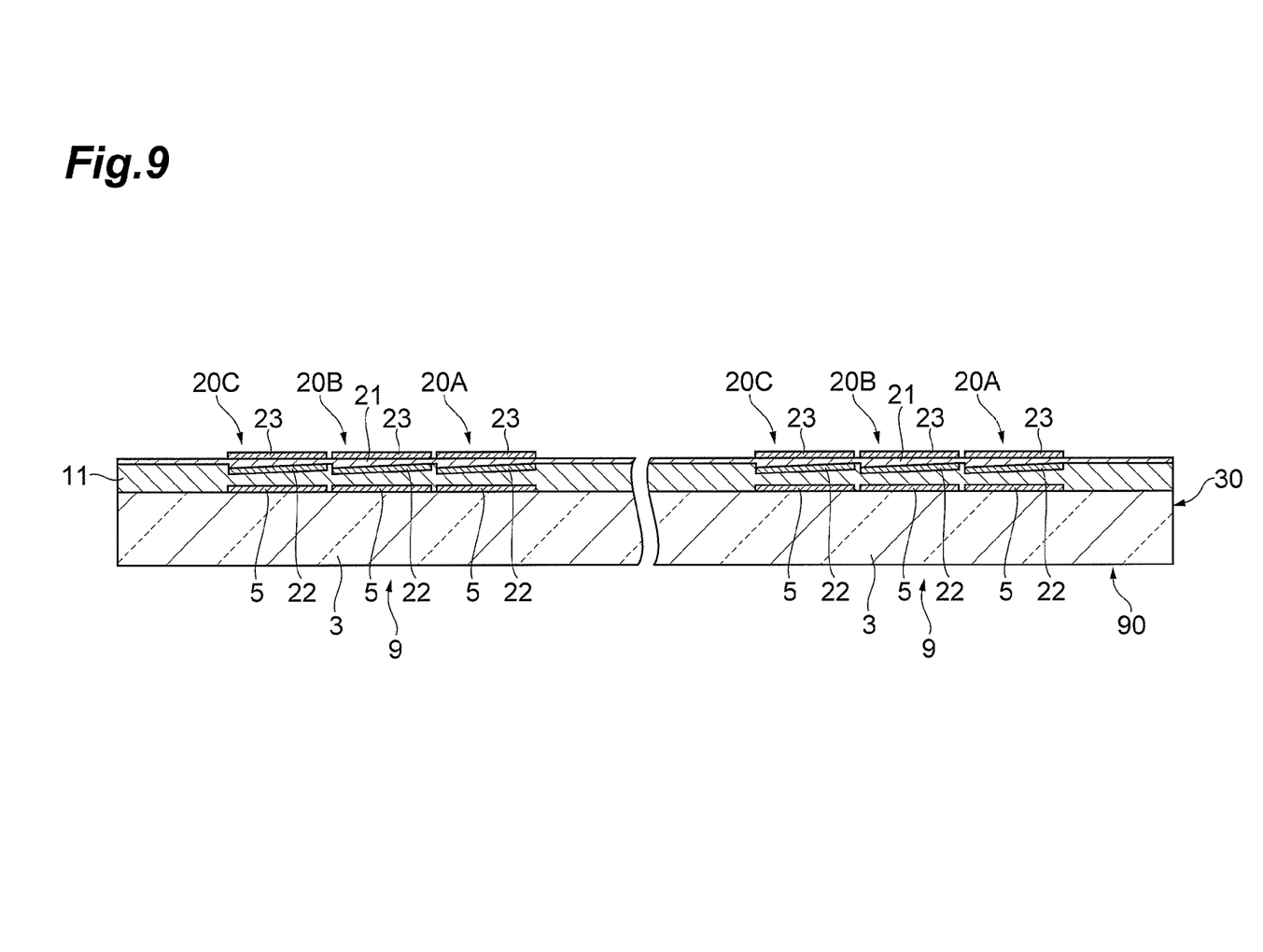
FIG. 9 is a sectional view for explaining the method of manufacturing the spectroscopic sensor of FIG. 1.

Then, as illustrated in FIG. 9, the DBR layers 23 are formed on the cavity layer 21 exposed by removing the handle substrate 50. As a consequence, for each part corresponding to one spectroscopic sensor 1, the DBR layers 22, 23 oppose each other through the cavity layer 21, so as to form the interference filter units 20A, 20B, 20C. While the part corresponding to one spectroscopic sensor 1 becomes a spectroscopic filter substrate 9, a spectroscopic filter wafer 90 including a plurality of spectroscopic filter substrates 9 arranged in a matrix is produced. For forming the DBR layers 23, film-forming by ion plating, vapor deposition, sputtering, or the like and patterning by photo-etching and liftoff or etching are performed. Each of the DBR layers 23 is a dielectric multilayer film which is a laminated film made of $SiO_2$, $TiO_2$, $Ta_2O_5$, $Nb_2O_5$, $Al_2O_3$, $MgF_2$, or the like.

Figure 10:
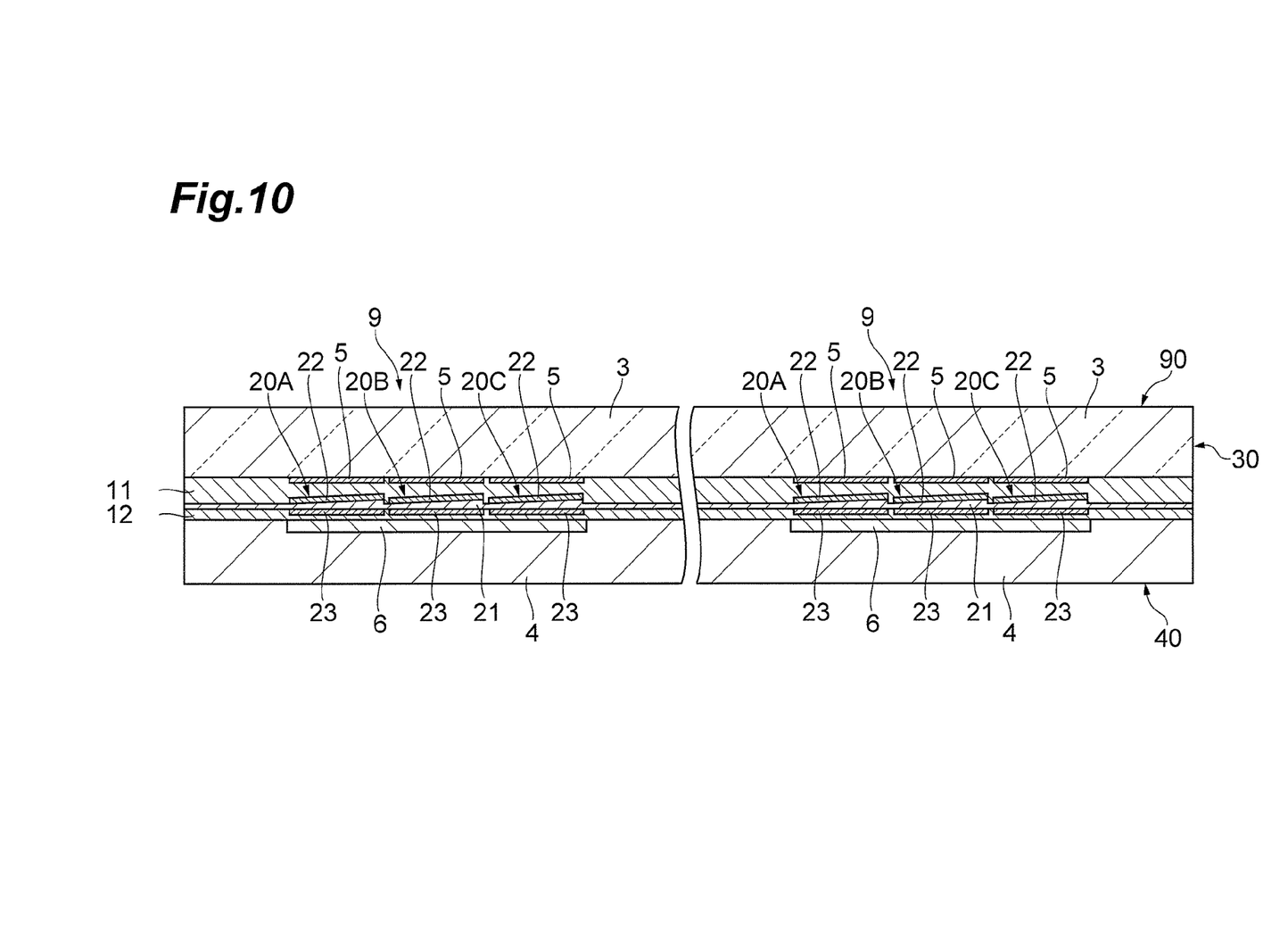
FIG. 10 is a sectional view for explaining the method of manufacturing the spectroscopic sensor of FIG. 1.

Thereafter, as illustrated in FIG. 10, a light detection wafer 40 including a plurality of light detection substrates 4 arranged in a matrix is prepared, and the spectroscopic filter wafer 90 and the light detection wafer 40 are joined to each other with the optical resin layer 12 such that the DBR layers 23 oppose the light-receiving unit 6 for each part corresponding to one spectroscopic sensor 1. That is, the light detection substrate 4 is joined onto the DBR layers 23 such that the DBR layers 23 oppose the light-receiving unit 6 through the optical resin layer 12. For this joint, after the optical resin layer 12 is applied to the whole surface of at least one of the spectroscopic filter wafer 90 and light detection wafer 40, the handle substrate 50 and the light detection wafer 40 are aligned with each other and joined together under heat, pressure, UV irradiation, or the like. Here, joining them in vacuum and then returning them into the air can inhibit voids from occurring in the optical resin layer 12.

Figure 11:
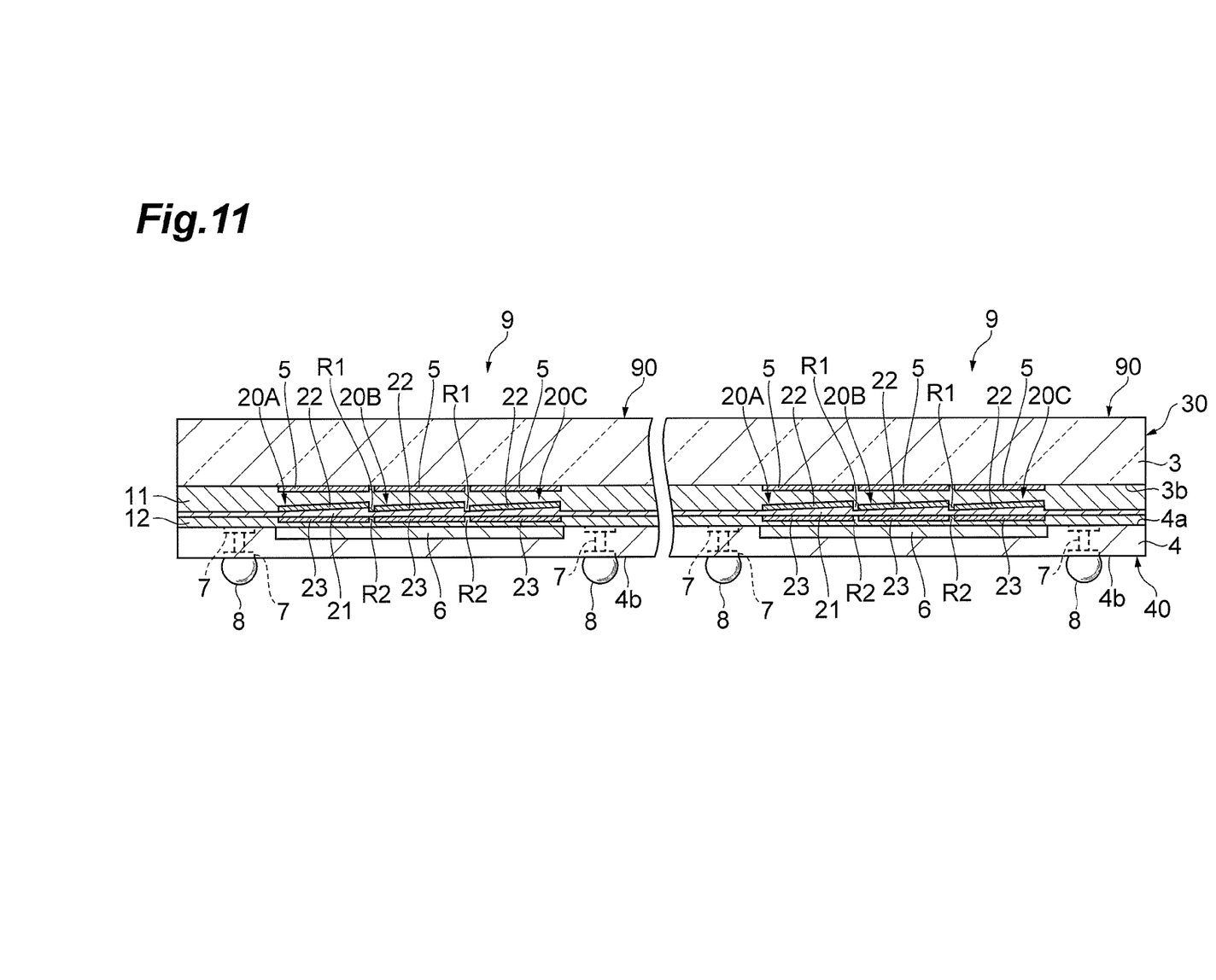
FIG. 11 is a sectional view for explaining the method of manufacturing the spectroscopic sensor of FIG. 1.
Figure 12:
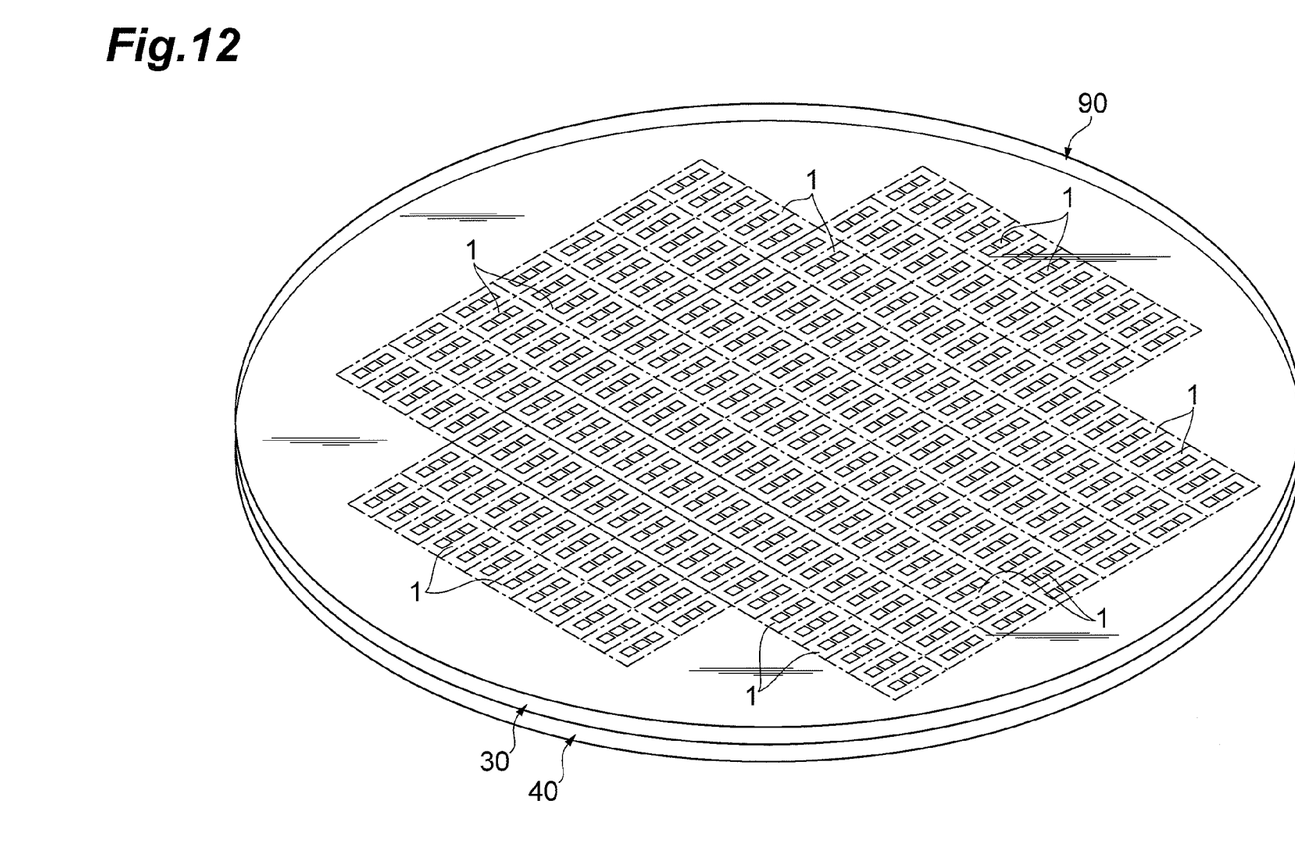
FIG. 12 is a perspective view for explaining the method of manufacturing the spectroscopic sensor of FIG. 1.

Next, as illustrated in FIG. 11, the rear face of the light detection wafer 40 is shaved, polished, etched, and so forth, such that the light detection wafer 40 is thinned to a thickness of about 10 to 150 μm. Then, through holes are formed by etching in parts corresponding to surface leads, so as to produce through-hole leads, rear face leads, and the like, whereby the leads 7 are formed for each part corresponding to one spectroscopic sensor 1. Further, the bumps 8 are formed on the rear face of the light detection wafer 40 for each part corresponding to one spectroscopic sensor 1. Subsequently, as illustrated in FIG. 12, the spectroscopic filter wafer 90 and light detection wafer 40 joined together are diced for each part corresponding to one spectroscopic sensor 1, whereby a plurality of spectroscopic sensors 1 are obtained.

As explained in the foregoing, the method of manufacturing the spectroscopic sensor 1 forms the cavity layer 21 by nanoimprinting on the handle substrate 50. Thus performing nanoimprinting with respect to the handle substrate 50 can stably yield the cavity layer 21 with high accuracy. After forming the cavity layer 21 and the DBR layers 22, 23 on the light-transmitting substrate 3 side, the light detection substrate 4 is joined thereto. This can prevent the light detection substrate 4 from being damaged in each of the processes for forming the cavity layer 21 and DBR layers 22, 23. Hence, the method of manufacturing the spectroscopic sensor 1 can yield the highly reliable spectroscopic sensor 1.

Since the spectroscopic filter wafer 90 and the light detection wafer 40 are joined to each other after performances of each of the spectroscopic filters 9 in the spectroscopic filter wafer 90 are inspected, the light detection wafer 40 can be prevented from being wasted because of defects on the spectroscopic filter wafer 90 side.

The handle substrate 50 has the selectively removable surface layer 52, which is selectively removed, so as to eliminate the handle substrate 50 from the cavity layer 21. Thus selectively removing the surface layer 52 of the handle substrate 50 can reduce the time required for eliminating the handle substrate 50 from the cavity layer 21, while preventing the cavity layer 21 from being damaged.

After forming the optical filter layers 5 on the light-transmitting substrate 3, the light-transmitting substrate 3 is joined onto the DBR layers 22 with the optical resin layer 11 interposed therebetween such that the DBR layers 22 oppose the optical filter layers 5 through the optical resin layer 11. This can make light in a predetermined wavelength range efficiently incident on the interference filter units 20A to 20C.

The outer edge parts of the cavity layer 21 are caused to reach their corresponding side faces of the handle substrate 50 (i.e., the side faces of the base layer 51 and surface layer 52), so as to form the cavity layer 21 on the handle substrate 50 such that the cavity layer 21 includes a region where the optical resin layer 11 is arranged when seen in the thickness direction of the handle substrate 50. As a consequence, only the cavity layer 21 comes into contact with the handle substrate 50 when removing the latter, whereby the handle substrate 50 can be removed under a simple condition that only a single etchant which effectively acts on the interface between the surface layer 52 and the cavity layer 21 is necessary.

The surface layer 52 of the handle substrate 50 itself may have a function of a release processing layer or the like, so as to make it easier to peel the handle substrate 50 off. When the cavity layer 21 and optical resin layer 11 are in contact with the surface layer 52 as illustrated in (a) of FIG. 13 (i.e., the cavity layer 21 is not formed on the handle substrate 50 such as to include a region where the optical resin layer 11 is arranged when seen in the thickness direction of the handle substrate 50) in such a case, the peeling force at the interface between the surface layer 52 and the cavity layer 21 differs from that at the interface between the surface layer 52 and the optical resin layer 11, which makes it hard to peel off the handle substrate 50 uniformly from the cavity layer 21. When the cavity layer 21 is formed on the handle substrate 50 such as to include a region where the optical resin layer 11 is arranged when seen in the thickness direction of the handle substrate 50 as illustrated in FIG. 7, by contrast, only the cavity layer 21 is in contact with the surface layer 52, whereby the handle substrate 50 can uniformly be peeled off from the cavity layer 21.

Figure 13:
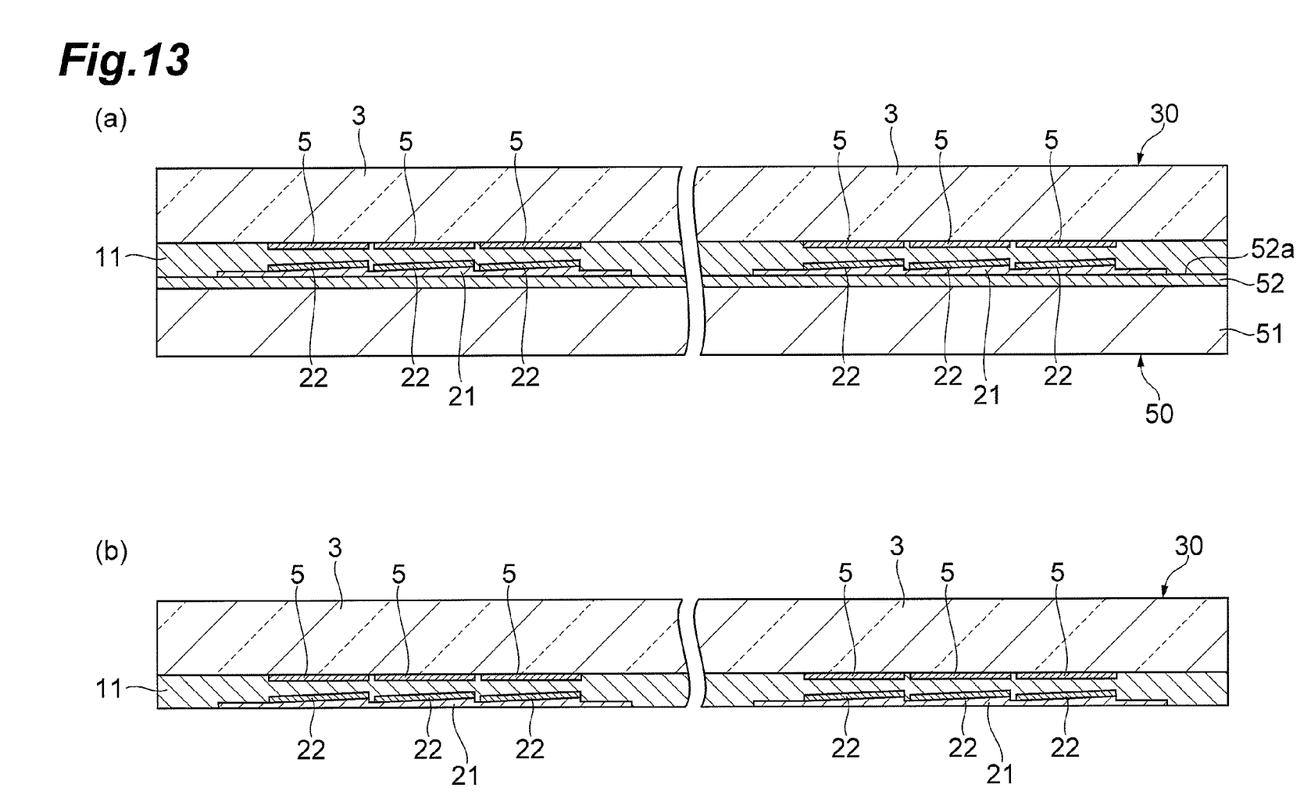
FIG. 13 is a sectional view for explaining a spectroscopic sensor manufacturing method in accordance with a comparative mode.

As illustrated in (b) of FIG. 13, the interface between the cavity layer 21 and the optical resin layer 11 is exposed on the rear face side after peeling off the handle substrate 50 from the cavity layer 21, whereby there is a possibility of the interface peeling off or a gap occurring at the interface in a thermal process such as photo-etching at the time of patterning the DBR layers 23 or film-forming. When the cavity layer 21 is formed on the handle substrate 50 such as to include a region where the optical resin layer 11 is arranged when seen in the thickness direction of the handle substrate 50, by contrast, only the cavity layer 21 is exposed on the rear face side after peeling off the handle substrate 50 from the cavity layer 21 as illustrated in FIG. 8, whereby such a problem concerning the interface can be prevented from occurring.

The present invention is not limited to one embodiment thereof explained in the foregoing. For example, the handle substrate 50 per se may be removable without having the surface layer 52. When selectively etching the handle substrate 50 away in such a case, it is preferable for the handle substrate 50 to be thinned beforehand by shaving, polishing, or the like.

The light detection substrate 4 is not limited to the one-dimensional sensor, but may be a two-dimensional sensor. The thickness of the cavity layer 21 may change two-dimensionally or stepwise. In place of the DBR layers 22, 23, single-layer metal reflective films made of AL, Au, Ag, or the like may be employed as mirror layers. In place of the joints with the optical resin layers 11, 12, joints at the outer peripheral parts of the spectroscopic sensor 1 may be employed. In this case, while keeping a gap with a spacer, joining with low-melting glass, solder, or the like is possible. A region surrounded by joints may be left as an air gap or filled with an optical resin. The optical filter layers 5 may be formed on the front face 3a side of the light-transmitting substrate 3 so as to oppose their corresponding interference filter units 20A, 20B, 20C. The light-transmitting substrate 3 may be constituted by filter glass (color glass).

INDUSTRIAL APPLICABILITY

The present invention can yield a highly reliable spectroscopic sensor.

REFERENCE SIGNS LIST

1 . . . spectroscopic sensor;
3 . . . light-transmitting substrate;
4 . . . light detection substrate;
5 . . . optical filter layer;
11 . . . optical resin layer;
20A, 20B, 20C . . . interference filter unit;
21 . . . cavity layer;
22 . . . DBR layer (first mirror layer);
23 . . . DBR layer (second mirror layer);
50 . . . handle substrate;
52 . . . surface layer

The invention claimed is:

1. A method of manufacturing a spectroscopic sensor comprising an interference filter unit, having a cavity layer and first and second mirror layers opposing each other through the cavity layer, for selectively transmitting therethrough light in a predetermined wavelength range according to an incident position thereof; a light-transmitting substrate for transmitting therethrough the light incident on the interference filter unit; and a light detection substrate for detecting the light transmitted through the interference filter unit;

the method comprising:
 a first step of forming the cavity layer by nanoimprinting on a handle substrate;
 a second step of forming the first mirror layer on the cavity layer after the first step;
 a third step of joining the light-transmitting substrate onto the first mirror layer after the second step;
 a fourth step of removing the handle substrate from the cavity layer after the third step;

a fifth step of forming the second mirror layer on the cavity layer without the handle substrate after the fourth step; and a sixth step of joining the light detection substrate onto the second mirror layer after the fifth step.

2. A method of manufacturing a spectroscopic sensor according to claim 1, wherein the handle substrate has a selectively removable surface layer;

wherein, in the first step, the cavity layer is formed on the surface layer; and wherein, in the fourth step, the handle substrate is removed from the cavity layer by selectively removing the surface layer.

3. A method of manufacturing a spectroscopic sensor according to claim 1, wherein, in the first step, when joining the light-transmitting substrate onto the first mirror layer with an optical resin layer interposed therebetween in the third step, the cavity layer is formed on the handle substrate such that the cavity layer includes a region where the optical resin layer is arranged.

4. A method of manufacturing a spectroscopic sensor according to claim 1, wherein an optical filter layer for transmitting the light in the predetermined wavelength range therethrough is formed on the light-transmitting substrate before the third step; and wherein, in the third step, the light-transmitting substrate is joined onto the first mirror layer such that the first mirror layer and the optical filter layer oppose each other.

5. A method of manufacturing a spectroscopic sensor according to claim 2, wherein, in the first step, when joining the light-transmitting substrate onto the first mirror layer with an optical resin layer interposed therebetween in the third step, the cavity layer is formed on the handle substrate such that the cavity layer includes a region where the optical resin layer is arranged.

6. A method of manufacturing a spectroscopic sensor according to claim 2, wherein an optical filter layer for transmitting the light in the predetermined wavelength range therethrough is formed on the light-transmitting substrate before the third step; and wherein, in the third step, the light-transmitting substrate is joined onto the first mirror layer such that the first mirror layer and the optical filter layer oppose each other.

7. A method of manufacturing a spectroscopic sensor according to claim 3, wherein an optical filter layer for transmitting the light in the predetermined wavelength range therethrough is formed on the light-transmitting substrate before the third step; and wherein, in the third step, the light-transmitting substrate is joined onto the first mirror layer such that the first mirror layer and the optical filter layer oppose each other.

8. A method of manufacturing a spectroscopic sensor according to claim 5, wherein an optical filter layer for transmitting the light in the predetermined wavelength range therethrough is formed on the light-transmitting substrate before the third step; and wherein, in the third step, the light-transmitting substrate is joined onto the first mirror layer such that the first mirror layer and the optical filter layer oppose each other.

* * * * *